(12) United States Patent
Close

(10) Patent No.: US 6,719,029 B2
(45) Date of Patent: Apr. 13, 2004

(54) TIRE WALL GAUGES TO OPTIMIZE RUNFLAT TIRE RIDE COMFORT

(75) Inventor: Roland Close, Burg-Reuland (BE)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 10/215,441

(22) Filed: Aug. 9, 2002

(65) Prior Publication Data

US 2004/0025998 A1 Feb. 12, 2004

(51) Int. Cl.⁷ .................... B60C 13/00; B60C 17/00
(52) U.S. Cl. .............. 152/454; 152/209.16; 152/517; 152/523
(58) Field of Search .................. 152/454, 517, 152/523, 209.16

(56) References Cited

U.S. PATENT DOCUMENTS

| | | | |
|---|---|---|---|
| 3,464,477 A | | 9/1969 | Verdier |
| 4,111,249 A | | 9/1978 | Markow |
| 5,058,646 A | * | 10/1991 | Kajikawa et al. ........... 152/454 |
| 5,368,082 A | | 11/1994 | Oare et al. |
| 5,427,166 A | | 6/1995 | Willard, Jr. |
| 5,511,599 A | | 4/1996 | Willard, Jr. |
| 6,401,777 B1 | * | 6/2002 | Verbeke-Ensch et al. ... 152/517 |

FOREIGN PATENT DOCUMENTS

| | | |
|---|---|---|
| EP | 0475258 A1 | 3/1992 |
| EP | 1022162 A1 * | 7/2000 |
| EP | 1145874 A2 * | 10/2001 |
| WO | WO 00/20236 A1 * | 4/2000 |
| WO | WO 00/46047 A1 * | 8/2000 |

* cited by examiner

Primary Examiner—Adrienne C. Johnstone
(74) Attorney, Agent, or Firm—Howard M. Cohn

(57) ABSTRACT

Runflat tire construction is optimized for tire ride comfort by reducing tire wall gauges in the tread-shoulder-to-upper-sidewall transition region and compensating with supporting sidewalls that constantly increase in thickness (gauge) from the transition region to a bead/flange area where a chafer extends above a wheel rim flange. Thus the bead and lower sidewall area are reinforced to a maximum and the shoulder area gets only the minimum stiffness necessary to achieve the required runflat performance. Within the context of wall gauges that constantly increase from the transition region to the bead/flange area, a mid-sidewall gauge ratio MSGR, being equal to a mid-sidewall gauge G2 divided by a shoulder gauge G1, is approximately within the range of 1.1 to 1.4, preferably approximately equal to 1.3; and a bead/flange gauge ratio BFGR, being equal to a bead/flange gauge G3 divided by a shoulder gauge G1, is approximately within the range of 1.5 to 1.8, preferably approximately equal to 1.7.

20 Claims, 4 Drawing Sheets

TIRE WALL GAUGES TO OPTIMIZE RUNFLAT TIRE RIDE COMFORT

TECHNICAL FIELD OF THE INVENTION

The present invention relates to the design of pneumatic, radial ply, runflat passenger tires.

BACKGROUND OF THE INVENTION

Various methods have been devised for enabling the safe continued operation of unpressurized or underpressurized vehicle tires with the intent of minimizing further damage to the uninflated tire and without simultaneously compromising vehicle handling over a distance from the place where the tire has lost its pressure to a place desired by the driver, such as a service station where the tire can be changed. Loss of tire pressure can result from a variety of causes, including puncture by a foreign object such as a nail or other sharp object piercing the pneumatic tire installed on a vehicle.

Pneumatic tires designed for sustained operation under conditions of unpressurization or underpressurization are also called runflat tires, as they are capable of being driven in the uninflated, or what would generally be called "flat," condition. The conventional pneumatic tire collapses upon itself when it is uninflated and is carrying the weight of a vehicle. The tire's sidewalls buckle outward in the circumferential portion of the tire where the tread contacts the ground, making the tire "flat."

The term "runflat" is generally used to describe a tire that is designed such that the tire structure alone, in particular the structure of the sidewalls, has sufficient rigidity and strength to support the vehicle load when the tire is operated without being inflated. The sidewalls and internal surfaces of the tire do not collapse or buckle onto themselves, and the tire does not otherwise contain or use other supporting structures or devices to prevent the tire from collapsing.

An early example of a runflat tire design is described in U.S. Pat. No. 4,111,249, entitled the "Banded Tire," in which a hoop or annular band approximately as wide as the tread is circumferentially deployed beneath the tread. The hoop in combination with the rest of the tire structure could support the vehicle weight in the uninflated condition.

Another approach taken has been simply to strengthen the sidewalls by increasing their cross-sectional thickness. However, due to the large amounts of rubber required to stiffen the sidewall members, flexure heating becomes a major factor in tire failure during runflat operation. This is especially so when the tire is operated for high speeds in the uninflated condition. Pirelli discloses such a runflat tire design in European Patent Publication No. 0-475-258A1.

In general, runflat tires incorporate sidewalls that are thicker and/or stiffer so that the tire's load can be carried by an uninflated tire with minimum adverse effects upon the tire itself and upon vehicle handling until such reasonable time as the tire can be repaired or replaced. The typical methods used in sidewall thickening and stiffening include the incorporation of circumferentially disposed wedge inserts in the inner peripheral surface of the sidewall portion of the carcass, which is the region in the tire usually having the lowest resistance to deformation under vertical loading. In such runflat tire designs, each sidewall is thickened in such a way that its overall thickness (gauge) is increased in the region between the bead and the tread shoulder.

The reinforced sidewalls of such tires, when operated in the uninflated condition, experience a net compressive load in the region of the sidewall that is closest to the road-contacting portion of the tire. Also, the bending stresses on the sidewalls are such that the outer portions of the reinforced sidewalls experience tensile forces while the inner portions experience compression stresses during runflat operation.

A Goodyear patent U.S. Pat. No. 5,368,082, by Oare et al, ('082), which has a common assignee and is incorporated in its entirety by reference herein, discloses a low aspect ratio runflat pneumatic radial ply tire which employs special sidewall inserts to improve stiffness. Approximately six additional pounds of weight per tire was required to support an 800 pound load in this uninflated tire. This earlier invention, although superior to prior attempts at runflat tire design, still imposed a weight penalty that could be offset by the elimination of a spare tire and the tire jack. However, this weight penalty becomes even more problematic in the design of tires having higher aspect ratios.

U.S. Pat. Nos. 5,427,166 and 5,511,599 of Walter L. Willard, Jr., disclose the addition of a third ply and the addition of a third insert in the sidewall of a tire to further increase the runflat performance of the tire over that of the U.S. Pat. No. 5,368,082 Oare et al. These two latter patents discuss some of the load relations that occur in the uninflated condition of the tire and they demonstrate that the Oare et al. concept can be applied to additional numbers of plies and inserts.

In general, runflat tire design is predicated upon the installation of reinforcing inserts inside each sidewall flex area. The inserts in each sidewall, in combination with the plies, add rigidity to the sidewalls in the absence of air pressure during runflat operation. The '082 Patent teaches a sidewall construction for runflat tires in which the tire is constructed with two plies, an inner liner and two reinforcing wedge inserts in each sidewall. The two inserts in each sidewall are disposed such that one insert is located between the two plies while the other insert is located between the inner liner and the first or innermost ply.

While the high resistance to compression deflection of the inserts provides the necessary resistance to the collapse of the uninflated loaded tire, the use of multiple plies and, in each sidewall, more than one reinforcing wedge insert, has drawbacks which include the above mentioned increase in tire weight and flexure-induced heat build up. Such designs also increase the tire's complexity in ways that adversely affect manufacturing and quality control.

U.S. Pat. No. 3,464,477 of Henri Verdier, and assigned to Michelin Corporation, discloses a pneumatic tire particularly for off-highway (OTR) use wherein the inflated tire is to be protected against damage such as cuts and abrasion to the sidewalls when the tire is used on rocky or rough ground. Although this is not a runflat design, there are useful teachings presented since the inventor has determined that sidewall damage from such OTR operation can be ameliorated by reinforcing the tire sidewalls: "surprisingly . . . the sidewalls should be reinforced inwardly of the carcass plies." The disclosed reinforcement of each sidewall is a single reinforcing wedge insert ("elastomeric reinforcement") which has a maximum thickness at the mid height of the sidewall of the tire between about 1% and 3% of the overall maximum width of the tire, the reinforcement tapering toward its edges, that is toward the tread and toward the corresponding head of the sidewall and extending about half of the height of the tire.

While a high resistance to compressive deflection of the inserts provides the necessary resistance to collapse of the uninflated loaded tire, the use of multiple plies and more than one reinforcing wedge insert in each sidewall has drawbacks which include the increase in tire weight and cyclical-flexure-induced heating.

In the interests of operating efficiency and performance when operating with the tire normally inflated, the modifications to the sidewall and other areas of the tire for providing runflat operation should not adversely interact with the normal inflated operation of the tire. However, as the structure of the sidewall is stiffened with inserts and additional plies to provide runflat operation, some of the desirable operational characteristics of the tire in its inflated state are compromised.

The weight of additional sidewall plies and inserts resists the ability of the automobile suspension to allow the wheel to move in response to variations in the road surface. The increase in stiffness of the sidewall reduces the ability of the tire to comply with variations in the road surface. Both the increase in weight and radial stiffness may degrade the ride comfort and quality increasing harshness and noise perceived by the driver. Increases in tire weight associated with additional plies and inserts will also tend to reduce the performance of the automobile in straight line acceleration and deceleration. The increase in tire weight also tends to increase fuel consumption.

Clearly, the goal in runflat tire design is to provide a low-cost, light-weight tire that gives good runflat vehicle handling as well as good service life during runflat operation without compromising the durability, efficiency or performance of the tire during normal fully inflated operation.

The sidewalls of a fully inflated, conventional tire are thin, light weight and flexible compared to the sidewall of a runflat tire. The flexibility of the sidewall allows the tread area to move radially inward to allow the tire to absorb bumps. As a portion of tread area moves radially inward, the adjacent sidewall radius of curvature is decreased as the sidewall bulges out. This bending of the sidewall results in a relatively small amount of bending stress because the conventional sidewall is thin. Under normal inflated operation, radial deflection is resisted by the compressive force of the air in the tire. The compressed air provides a resistance to radial deflection that is more than proportional to the deflection. For example a 10% increase in radial deflection will require more than a 10% increase in the load. In effect, the overall modulus of elasticity of a conventional tire with respect to radial deflection is not constant but increases as the deflection decreases the volume of air contained by the tire.

The reinforced sidewalls of runflat tires resist the radial deflection with a combination of compressive and bending stresses in the inflated as well as the uninflated condition. Runflat fires experience a net compressive load in the region of the sidewall closest to the road-contacting portion of the tread. Also, the bending stresses on the thickened sidewalls are such that the outer portions of the sidewalls experience tensile forces while the inner portions experience compression stresses. Thus in addition to providing the structural rigidity required for runflat operation, the reinforced sidewalls of most runflat designs also reduce the desirable radial flexibility of the tire in the inflated condition. Accordingly, the reinforced sidewalls of runflat tires tend to detract from riding comfort, due to the increased structural rigidity of the tire.

It is apparent that there is a need to develop a runflat tire structure that provides the necessary structural rigidity in the uninflated condition, while also providing sufficient radial flexibility to optimize ride and handling characteristics in the normal inflated condition.

BRIEF SUMMARY OF THE INVENTION

The present invention relates to a pneumatic radial ply runflat tire comprising a tread cap, two inextensible annular beads, a carcass comprising a radial ply structure, a gas-impervious inner liner, a belt structure located between the tread cap and the radial ply structure, two sidewalls each of which is reinforced with one or more wedge inserts, a pair of transition regions wherein the tread cap smoothly transitions into each sidewall, a pair of bead filler apexes, and a pair of chafers that protect the underlying ply structure from abrasion against a wheel rim having a rim flange. In a first embodiment, the runflat tire of the present invention has a radial ply structure that comprises at least two plies, and has at least two pairs of sidewall wedge inserts. In a second embodiment, the runflat tire of the present invention has a radial ply structure that comprises a single ply, and has one pair of sidewall wedge inserts. The invention can be generalized such that its scope includes all runflat tires having sidewalls with increased gauges (wall thicknesses) due to stiffening inserts and/or other stiffening devices such as fabric strips.

According to the present invention, the embodiments of the pneumatic radial ply runflat tire are characterized by tire wall gauges that constantly increase in thickness from the transition region to a bead/flange area where the chafer extends axially outward over the rim flange when the tire is mounted on the wheel rim.

According to the present invention, the embodiments of the pneumatic radial ply runflat tire may be further characterized by: a tire wall gauge being a shoulder gauge, measured in the middle of the transition regions; a tire wall gauge being a bead/flange gauge, measured immediately radially outward of the portion of the chafer that contacts the wheel rim flange; and a bead/flange gauge ratio, being defined as the bead/flange gauge divided by the shoulder gauge; wherein the bead/flange gauge ratio is within the range of 1.5 to 1.8 and preferably is approximately equal to 1.7. The embodiments of the pneumatic radial ply runflat tire may be further characterized by: a tire wall gauge being a mid-sidewall gauge, measured at the middle of the section height of the sidewall; and a mid-sidewall gauge ratio, being defined as the mid-sidewall gauge divided by the shoulder gauge; wherein the mid-sidewall gauge ratio is within the range of 1.1 to 1.4 and preferably is approximately equal to 1.3.

According to the present invention, the embodiments of the pneumatic radial ply runflat tire may be further characterized by a tire wall gauge being a shoulder gauge, measured in the middle of the transition regions; a tire wall gauge being a mid-sidewall gauge, measured at the middle of the section height of the sidewall; and a mid-sidewall gauge ratio, being defined as the mid-sidewall gauge divided by the shoulder gauge; wherein the mid-sidewall gauge ratio is within the range of 1.1 to 1.4 and preferably is approximately equal to 1.3.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
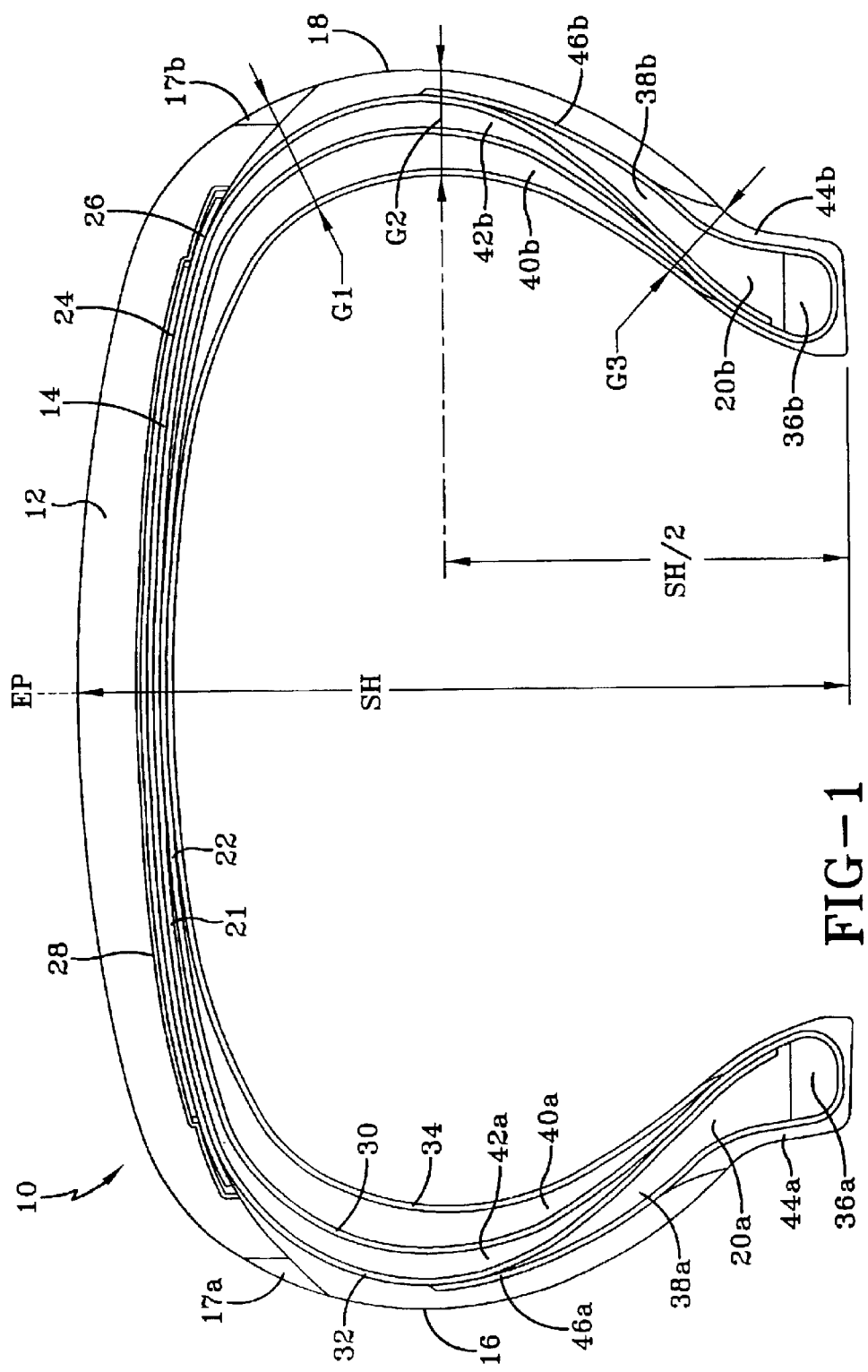
Figure 2:
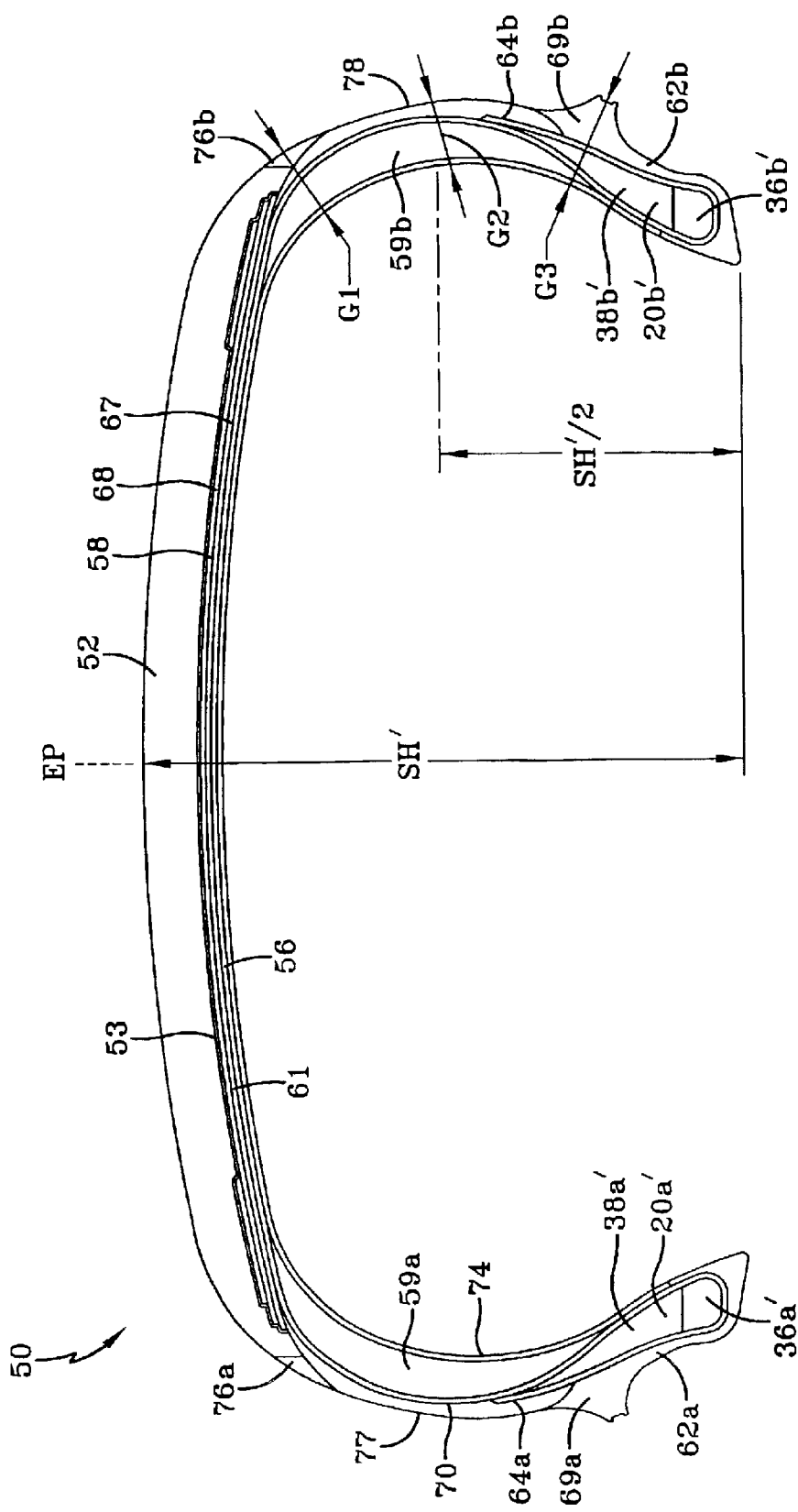
Figure 3:
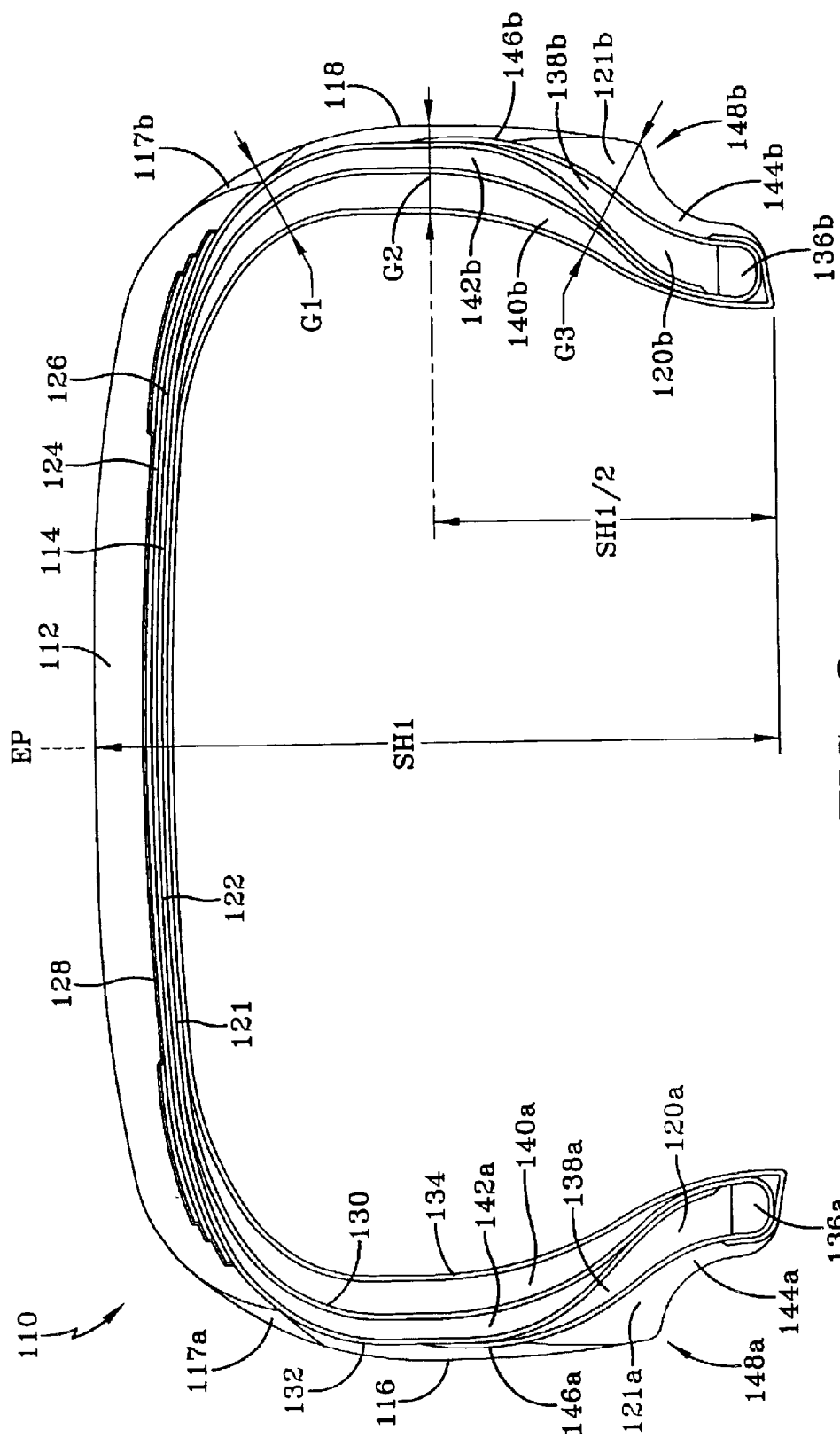
Figure 4:
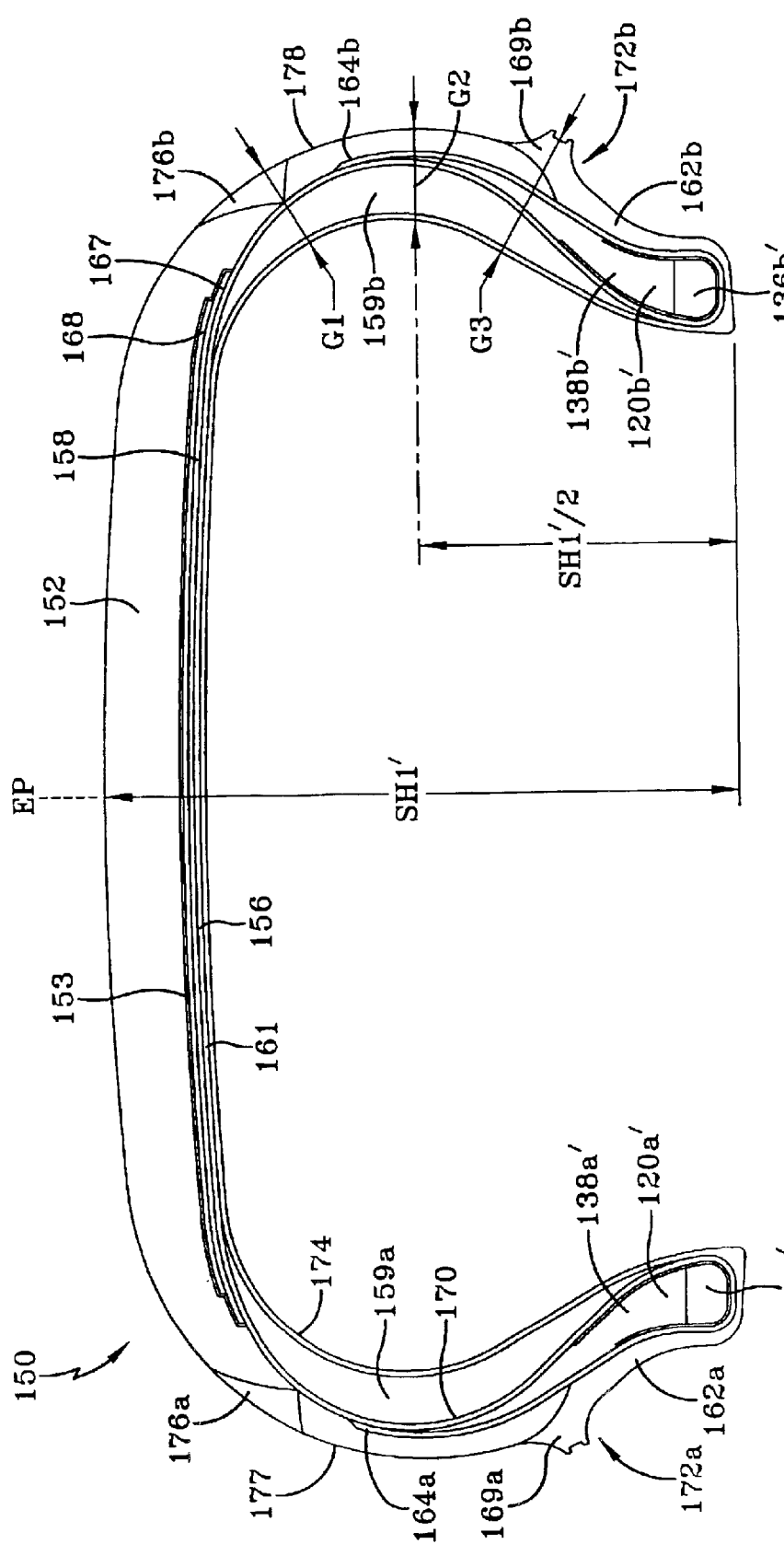

The structure, operation, and advantages of the invention will become further apparent upon consideration of the following description taken in conjunction with the accompanying drawings, wherein:

FIG. 1 is a cross-sectional view of a prior art runflat tire design incorporating multiple wedge inserts in each sidewall and multiple plies in the ply structure;

FIG. 2 is a cross sectional view of a prior art runflat tire design incorporating a single wedge insert in each sidewall and a single ply in the ply structure;

FIG. 3 is a cross sectional view of an embodiment of a runflat tire incorporating two inserts per sidewall and a double ply, and having sidewall gauges in accordance with the present invention; and FIG. 4 is a cross sectional view of an embodiment of a runflat tire incorporating one insert per sidewall and a single ply, and having sidewall gauges in accordance with the present invention.

DEFINITIONS

"Apex" means an elastomeric filler located radially above the bead core and between the plies and the turnup plies.

"Aspect Ratio" means the ratio of the section height of a tire to its section width; also refers to the cross-sectional profile of the tire; a low-profile tire, for example, has a low aspect ratio.

"Axial" and "Axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe-guards and chafers.

"Belt Structure" or "Reinforcement Belts" or "Belt Package" means at least two annular layers or plies of parallel cords, woven or unwoven, underlying the tread, unanchored to the bead, and having both left and right cord angles in the range from 18° to 30° relative to the equatorial plane of the tire.

"Breakers" or "Tire Breakers" means the same as belt or belt structure or reinforcement belts.

"Carcass" means the tire structure apart from the belt structure, tread, undertread over the plies, but including the beads.

"Casing" means the carcass, belt structure, beads, sidewalls and all other components of the tire excepting the tread and undertread.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Crown" or "Tire Crown" means the tread, tread shoulders and the immediately adjacent portions of the sidewalls.

"Equatorial Plane" means the plane perpendicular to the tire's axis of rotation and passing through the center of its tread; or the plane containing the circumferential centerline of the tread.

"Footprint" means the contact patch or area of contact of the tire tread with a flat surface at a given speed and under normal load and pressure.

"Gauge" refers to cross-sectional thickness, measured along a line that is normal to at least one surface of what is being measured. For tire wall or sidewall gauges, the thickness is measured along a line that is normal to the innermost surface of the tire wall.

"Inner Liner" means the layer or layers of elastomer or other material that form the inside surface of a tubeless tire and that contain the inflating gas or fluid within the tire.

"Insert" means the crescent- or wedge-shaped reinforcement typically used to reinforce the sidewalls of runflat-type tires; it also refers to the elastomeric non-crescent-shaped insert that underlies the tread.

"Lateral" means a direction parallel to the axial direction.

"Normal Inflation Pressure" means the specific design inflation pressure at a specified load assigned by the appropriate standards organization for the service condition for the tire.

"Normal Load" means the specific design load at a specified inflation pressure assigned by the appropriate standards organization for the service condition for the tire.

"Ply" means a cord-reinforced layer of rubber-coated radially deployed or otherwise parallel cords.

"Radial" and "radially" mean directions radially toward or away from the axis of rotation of the tire.

"Radial Ply Structure" means the one or more carcass plies of which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tangential" and "Tangentially" refer to segments of circular curves that intersect at a point through which can be drawn a single line that is mutually tangential to both circular segments.

"Toe-guard" refers to the circumferentially deployed elastomeric rim-contacting portion of the tire axially inward of each bead.

"Tread Cap" refers to the tread and the underlying material into which the tread pattern is molded.

"Tread Contour" means the shape of a tire tread as viewed in axial cross section. "Tread width" means the arc length of the tread surface in the plane includes the axis of rotation of the tire.

"Wedge Insert" means the same as "Insert."

DETAILED DESCRIPTION OF THE PREFERRED EMBODIMENT

Prior Art Embodiments

With reference to FIG. 1, a cross section of a typical multiple-insert prior art pneumatic radial runflat tire 10 is illustrated. The tire 10 has a tread cap 12, a belt structure 14 comprising belts 24,26, a pair of sidewall portions 16,18, a pair of transition regions 17a,17b wherein the tread cap 12 smoothly transitions into the sidewall portions 16,18, respectively, a pair of bead regions 20a,20b, a carcass 21 with a ply structure 22, and a fabric overlay 28 deployed between the bottom portion of the tread cap 12 and the upper parts of the belt structure 14. The carcass 21 comprises the ply structure 22 having a first ply 30 and second ply 32, a gas-impervious inner liner 34, a pair of beads 36a,36b, a pair of bead filler apexes 38a,38b, a first pair of sidewall wedge inserts 40a,40b, and a second pair of sidewall wedge inserts 42a,42b. The first or innermost wedge insert 40a,40b is located between the inner liner 34 and the first ply 30, and the second wedge insert 42a,42b is located between the first ply 30 and the second ply 32. The fabric overlay 28 is disposed beneath, or radially inward of, tread cap 12 and on top of, or radially outward from, belt structure 14. The innermost ply 30 wraps around the beads 36a,36b and has turnup ends 46a,46b that extend well out into the sidewall portions 16,18, respectively. The reinforced sidewall portions 16,18 include chafers 44a,44b that protect the underlying ply structure 22 from abrasion against a wheel rim (not shown). The tire 10 has a section height SH indicated on the equatorial plane EP.

The reinforced sidewall portions 16,18 of ply structure 22 give the tire 10 a limited runflat capability. As can be seen from FIG. 1, the structural reinforcement in the sidewall area of the tire 10 substantially increases the overall thickness of the sidewall portions 16,18, particularly in the middle of the sidewalls 16,18 where the wedge inserts 40a,40b,42a,42b are thickest. For example, representative sidewall thicknesses may comprise: a shoulder gauge G1, measured in the middle of the transition regions 17a,17b; a mid-sidewall gauge G2, measured at the middle SH/2 of the section height of the sidewall 16,18; and a bead/flange gauge G3, measured in the bead area immediately above (radially outward of) the portion of the bead area 20a,20b that contacts a wheel rim flange (not shown). For the purpose of comparing relative tire wall thicknesses, ratios can be defined as follows: a mid-sidewall gauge ratio MSGR being equal to the mid-sidewall gauge G2 divided by the shoulder gauge G1; and a bead/flange gauge ratio BFGR being equal to the bead/flange gauge G3 divided by the shoulder gauge G1. In equation form:

$$MSGR = G2/G1$$

$$BFGR = G3/G1$$

For the exemplary prior art tire 10 illustrated in FIG. 1, the sidewall gauges G1,G2,G3 are similar, i.e., the mid-sidewall gauge ratio MSGR is approximately 1.10 and the bead/flange gauge ratio BFGR is approximately 1.05.

FIG. 2 shows a cross-sectional view of a typical single-insert prior art pneumatic radial runflat tire 50. The tire 50 differs from the multiple-insert tire 10 of FIG. 1 in several ways: for example, it has only a single wedge insert 59a,59b in each sidewall 77,78, respectively; and a ply structure 56 consists, in a preferred embodiment, of a single ply 70 that is reinforced with high-modulus cords.

Tire 50, in FIG. 2, otherwise shares similarities in structure with the tire 10 of FIG. 1. The tire 50 has a tread cap 52, a pair of sidewall portions 77,78, a pair of transition regions 76a,76b wherein the tread cap 52 smoothly transitions into the sidewall portions 77,78, respectively, a pair of bead regions 20a',20b', a belt structure 58 comprising two belts 67,68 and a fabric overlay 53 deployed between the bottom portion of tread cap 52 and the upper, or radially outermost, parts of the belt structure 58. A carcass 61 comprises the ply structure 56 having the single ply 70, a gas-impervious inner liner 74, a pair of beads 36a',36b', and a pair of bead filler apexes 38a',38b'. The single wedge insert 59a,59b in each sidewall portion 77,78, respectively, is located between the inner liner 74 and the first ply 70. The fabric overlay 53 is disposed beneath, or radially inward of, the tread cap 52 and on top of, or radially outward from, the belt structure 58. The ply 70 has turnup ends 64a,64b that extend well out into the sidewall portions 77,78, respectively. The reinforced sidewall portions 77,78 depicted in FIG. 2 include chafers 62a,62b and rim flange protectors 69a,69b (also known as wheel-rim retainer lips). The rim flange protectors 69a,69b maintain the tire upon a wheel rim (not shown) during runflat operation, while the chafers 62a,62b protect the underlying ply structure 56 from abrasion against the wheel rim. The tire 50 has a section height SH' indicated on the equatorial plane EP'.

The reinforced sidewall portions 77,78 of ply structure 56 give the tire 50 a limited runflat capability. As can be seen from FIG. 2, the structural reinforcement in the sidewall area of the tire 50 substantially increases the overall thickness of the sidewall portions 77,78, particularly in the transition regions. For example, representative sidewall thicknesses may comprise: a shoulder gauge G1, measured in the middle of the transition regions 76a,76b; a mid-sidewall gauge G2, measured at the middle SH'/2 of the section height of the sidewall 77,78, and a bead/flange gauge G3, measured in the bead area immediately above (radially outward of) the portion of the bead area 20a',20b' that contacts a wheel rim flange (not shown). In tire designs having rim flange protectors 69a,69b as illustrated in FIG. 2, the bead/flange gauge G3 is measured as shown to a flat outer surface of the rim flange protectors 69a,69b exclusive of any decorative ribbing. For the purpose of comparing relative tire wall thicknesses, the gauge ratios MSGR, BFGR can be defined as described hereinabove. For the exemplary prior art tire 50 illustrated in FIG. 2, the sidewall gauges G1,G2,G3 are similar, i.e., the mid-sidewall gauge ratio MSGR is approximately 0.85 and the bead/flange gauge ratio BFGR is approximately 1.15.

Thus, the generalized prior art runflat tire designs 10,50 show the more or less uniformly thickened sidewalls that characterize run flat tire designs. The insert-reinforced sidewalls are necessary to support the tire's load with minimal sidewall deflection when the runflat tire 10,50 is in an uninflated state. Such runflat tire designs provide good vehicle handling and performance under conditions of full inflation, and they yield acceptable runflat vehicle handling and runflat operational life when the tire is uninflated. However, the rolling ride and comfort of such runflat tire designs may be somewhat compromised due to a high coupling effect between the reinforced sidewalls and the tire crown area.

It should be apparent that the prior art runflat tire designs 10,50 presented herein are merely representative of a wide range of runflat tire designs that are generally characterized by sidewall stiffening devices comprising at least one insert (e.g., 40a,40b,42a,42b,59a,59b) placed in each sidewall (e.g., 16,18,77,78) among at least one ply (e.g., 30,32,70) of the radial ply structure (e.g., 22,56). It should be further understood that the sidewall stiffening devices may also include other elements, for example, such as fabric strips (not illustrated).

Concept of the Invention

The basic concept for the present invention is to improve runflat tire ride comfort by reducing tire wall gauges in the shoulder and transition regions and to compensate with supporting sidewalls that constantly increase in thickness from the transition region to the bead/flange area. Thus the bead and lower sidewall area are reinforced to a maximum and the shoulder area gets only the minimum stiffness necessary to achieve the required runflat performance. In a very simplified way, it can be said that the bead and lower sidewall area is carrying the crown area under runflat conditions. This concept has been applied to experimental tires, and specific gauge ratios MSGR, BFGR have been determined and experimentally proven in embodiments such as the two embodiments to be described hereinbelow with reference to FIGS. 3 and 4. Within the inventive context of wall gauges that constantly increase from the transition region to the bead/flange area, the inventive mid-sidewall gauge ratio MSGR is approximately within the range of 1.1 to 1.4, preferably approximately equal to 1.3; and the bead/flange gauge ratio BFGR is approximately within the range of 1.5 to 1.8, preferably approximately equal to 1.7. The invention will now be illustrated with two embodiments that provide solutions to the ride comfort problems of both multiple-insert and single-insert versions of runflat tires.

First Embodiment of the Invention

A first embodiment of the invention is illustrated by the tire 110 in FIG. 3 that shows a cross-sectional view of an inventive multiple-insert pneumatic radial runflat tire 110 (compare tire 10 in FIG. 1). The tire 110 is, for example, a 235/55R17 runflat tire. The tire 110 has a tread cap 112, a belt structure 114 comprising belts 124,126, a pair of sidewall portions 116,118, a pair of transition regions 117a,117b wherein the tread cap 112 smoothly transitions into the sidewall portions 116,118, respectively, a pair of bead regions 120a,120b, a carcass 121 with a ply structure 122, and a fabric overlay 128 deployed between the bottom portion of the tread cap 112 and the upper parts of the belt structure 114. The carcass 121 comprises the ply structure 122 having a first ply 130 and second ply 132, a gas-impervious inner liner 134, a pair of beads 136a,136b, a pair of bead filler apexes 138a,138b, a first pair of sidewall wedge inserts 140a,140b, and a second pair of sidewall wedge inserts 142a,142b. The first or innermost wedge insert 140a,140b is located between the inner liner 134 and the first ply 130, and the second wedge insert 142a,142b is located between the first ply 130 and the second ply 132. The fabric overlay 128 is disposed beneath, or radially inward of, tread cap 112 and on top of, or radially outward from, belt structure 114. The innermost ply 130 wraps around the beads 136a,136b and has turnup ends 146a,46b that extend well out into the sidewall portions 116,118, respectively. The reinforced sidewall portions 116,118 include chafers 144a, 144b that protect the underlying ply structure 122 from abrasion against a wheel rim (not shown). The elastomer in the chafers 144a,144b is extended axially outward over a rim flange (not shown) thereby providing a thickened tire gauge in a bead/flange area 148a,148b. The tire 110 has a section height SH1 indicated on the equatorial plane EP1.

The reinforced sidewall portions 116,118 of ply structure 122 give the tire 110 a runflat capability. As can be seen from FIG. 3, the structural reinforcement in the sidewall area of the tire 110 follows the inventive concept wherein wall gauges constantly increase from the transition region 117a, 117b to the bead/flange area 148a,148b. The wall gauges are increased by means of proper shaping and sizing of the wedge inserts 140a,140b,142a,142b and of the elastomer in both the transition region 117a,117b and in the bead/flange area 148a,148b. In the tire 110 as constructed for the first embodiment of the invention, the shoulder gauge G1, measured in the middle of the transition regions 117a,117b, is 14.0 mm; the mid-sidewall gauge G2, measured at the middle SH1/2 of the section height of the sidewall 116,118, is 17.9 mm; and the bead/flange gauge G3, measured across the bead/flange area 148a,148b immediately above (radially outward of) the portion of the bead area 120a,120b that contacts a wheel rim flange (not shown), is 23.7 mm. As a result, the mid-sidewall gauge ratio MSGR calculates to 1.28 (17.9 divided by 14.0); and the bead/flange gauge ratio BFGR calculates to 1.69 (23.7 divided by 14.0).

Second Embodiment of the Invention

A second embodiment of the invention is illustrated by the tire 150 in FIG. 4 that shows a cross-sectional view of an inventive single-insert pneumatic radial runflat tire 150 (compare tire 50 in FIG. 2). The tire 150 is, for example, a 205/50R17 runflat tire. The tire 150 differs from the multiple-insert tire 110 of FIG. 3 in several ways: for example, it has only a single wedge insert 159a,159b in each sidewall 177,178, respectively; and a ply structure 156 consists, in a preferred embodiment, of a single ply 170 that is reinforced with high-modulus cords.

Tire 150, in FIG. 4, otherwise shares similarities in structure with the tire 110 of FIG. 3. The tire 150 has a tread cap 152, a pair of sidewall portions 177,178, a pair of transition regions 176a,176b wherein the tread cap 152 smoothly transitions into the sidewall portions 177,178, respectively, a pair of bead regions 120a',120b', a belt structure 158 comprising two belts 167,168 and a fabric overlay 153 deployed between the bottom portion of tread cap 152 and the upper, or radially outermost, parts of the belt structure 158. A carcass 161 comprises the ply structure 156 having the single ply 170, a gas-impervious inner liner 174, a pair of beads 136a',136b', and a pair of bead filler apexes 138a',138b'. The single wedge insert 159a,159b in each sidewall portion 177,178, respectively, is located between the inner liner 174 and the first ply 170. The fabric overlay 153 is disposed beneath, or radially inward of, the tread cap 152 and on top of, or radially outward from, the belt structure 158. The ply 170 has turnup ends 164a,164b that extend well out into the sidewall portions 177,178, respectively. The reinforced sidewall portions 177,178 depicted in FIG. 4 include chafers 162a,162b and rim flange protectors 169a,169b (also known as wheel-rim retainer lips) in bead/flange areas 172a,172b. The rim flange protectors 169a, 169b maintain the tire upon a wheel rim (not shown) during runflat operation, while the chafers 162a,162b protect the underlying ply structure 156 from abrasion against the wheel rim. The tire 150 has a section height SH1' indicated on the equatorial plane EP1'.

The reinforced sidewall portions 177,178 of ply structure 156 give the tire 150 a runflat capability. As can be seen from FIG. 4, the structural reinforcement in the sidewall area of the tire 150 follows the inventive concept wherein wall gauges constantly increase from the transition region 176a, 176b to the rim flange protectors 169a,169b in the bead/flange areas 172a,172b. The wall gauges are increased by means of proper shaping and sizing of the wedge insert 159a,159b and of the elastomer in both the transition region 176a,176b and in the rim flange protectors 169a,169b. In the tire 150 as constructed for the second embodiment of the invention, the shoulder gauge G1, measured in the middle of the transition regions 176a,176b, is 12.4 mm; the mid-sidewall gauge G2, measured at the middle SH1'/2 of the section height of the sidewall 177,178, is 15.8 mm; and the bead/flange gauge G3, measured as shown to a flat outer surface of the rim flange protectors 169a,169b exclusive of any decorative ribbing, is 20.9 mm. As a result, the mid-sidewall gauge ratio MSGR calculates to 1.27 (15.8 divided by 12.4); and the bead/flange gauge ratio BFGR calculates to 1.68 (20.9 divided by 12.4).

It should be apparent that the embodiments of the inventive runflat tire constructions 110,150 presented herein are merely representative of a wide range of runflat tire constructions that can be designed according to the teachings of the present invention. Accordingly, the present invention may generally be implemented in any pneumatic radial ply runflat tire that is characterized by sidewall stiffening devices comprising at least one insert (e.g., 140a,140b,142a, 142b,159a,159b) placed in each sidewall (e.g., 116,118,177, 178) among at least one ply (e.g., 130,132,170) of the radial ply structure (e.g., 122,156). It should be further understood that the sidewall stiffening devices may also include other elements, for example, such as fabric strips (not illustrated). Furthermore, the present invention is not limited to any particular materials or compounds that may be employed in the inserts and other elements of the tire construction.

Testing of a variety of experimental runflat tires constructed according to the present invention has shown, on the average, a significantly improved ride comfort as compared to comparable prior art runflat tires. The present invention apparently meets the need to develop a runflat tire structure that provides the necessary structural rigidity in the uninflated condition, while also providing sufficient radial flexibility to optimize ride and handling characteristics in the normal inflated condition.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A pneumatic radial ply runflat tire comprising: a tread cap, two inextensible annular beads, a radial ply structure with at least two plies, a gas-impervious inner liner, a belt structure located between the tread cap and the radial ply structure, two sidewalls, a pair of transition regions wherein the tread cap smoothly transitions into each sidewall, a pair of bead filler apexes, at least two pairs of sidewall wedge inserts, and a pair of chafers that protect the underlying ply structure from abrasion against a wheel rim having a rim flange, the tire being characterized by:

tire wall gauges that constantly increase in thickness from the transition region to a bead/flange area where the chafer extends axially outward over the rim flange when the tire is mounted on the wheel rim.

2. The pneumatic radial ply runflat tire of claim 1, further characterized by:

a tire wall gauge being a shoulder gauge, measured in the middle of the transition regions;

a tire wall gauge being a bead/flange gauge, measured immediately radially outward of the portion of the chafer that contacts the wheel rim flange; and a bead/flange gauge ratio, being defined as the bead/flange gauge divided by the shoulder gauge; wherein:

the bead/flange gauge ratio is within the range of 1.5 to 1.8.

3. The pneumatic radial ply runflat tire of claim 2, wherein:

the bead/flange gauge ratio is approximately equal to 1.7.

4. The pneumatic radial ply runflat tire of claim 2, further characterized by:

a tire wall gauge being a mid-sidewall gauge, measured at the middle of the section height of the sidewall; and a mid-sidewall gauge ratio, being defined as the mid-sidewall gauge divided by the shoulder gauge; wherein:

the mid-sidewall gauge ratio is within the range of 1.1 to 1.4.

5. The pneumatic radial ply runflat tire of claim 4, wherein:

the mid-sidewall gauge ratio is approximately equal to 1.3.

6. The pneumatic radial ply runflat tire of claim 1, further characterized by:

a tire wall gauge being a shoulder gauge, measured in the middle of the transition regions;

a tire wall gauge being a mid-sidewall gauge, measured at the middle of the section height of the sidewall; and a mid-sidewall gauge ratio, being defined as the mid-sidewall gauge divided by the shoulder gauge; wherein:

the mid-sidewall gauge ratio is within the range of 1.1 to 1.4.

7. The pneumatic radial ply runflat tire of claim 6, wherein:

the mid-sidewall gauge ratio is approximately equal to 1.3.

8. A pneumatic radial ply runflat tire comprising: a tread cap, two inextensible annular beads, a radial ply structure with a single ply, a gas-impervious inner liner, a belt structure located between the tread cap and the radial ply structure, two sidewalls, a pair of transition regions wherein the tread cap smoothly transitions into each sidewall, a pair of bead filler apexes, one pair of sidewall wedge inserts, and a pair of chafers that protect the underlying ply structure from abrasion against a wheel rim having a rim flange, the tire being characterized by:

tire wall gauges that constantly increase in thickness from the transition region to a bead/flange area where the chafer extends axially outward over the rim flange when the tire is mounted on the wheel rim.

9. The pneumatic radial ply runflat tire of claim 8, further characterized by:

a tire wall gauge being a shoulder gauge, measured in the middle of the transition regions;

a tire wall gauge being a bead/flange gauge, measured immediately radially outward of the portion of the chafer that contacts the wheel rim flange; and a bead/flange gauge ratio, being defined as the bead/flange gauge divided by the shoulder gauge; wherein:
the bead/flange gauge ratio is within the range of 1.5 to 1.8.

10. The pneumatic radial ply runflat tire of claim 9, wherein:
the bead/flange gauge ratio is approximately equal to 1.7.

11. The pneumatic radial ply runflat tire of claim 9, further characterized by:
a tire wall gauge being a mid-sidewall gauge, measured at the middle of the section height of the sidewall; and
a mid-sidewall gauge ratio, being defined as the mid-sidewall gauge divided by the shoulder gauge; wherein:
the mid-sidewall gauge ratio is within the range of 1.1 to 1.4.

12. The pneumatic radial ply runflat tire of claim 11, wherein:
the mid-sidewall gauge ratio is approximately equal to 1.3.

13. The pneumatic radial ply runflat tire of claim 8, further characterized by:
a tire wall gauge being a shoulder gauge, measured in the middle of the transition regions;
a tire wall gauge being a mid-sidewall gauge, measured at the middle of the section height of the sidewall; and
a mid-sidewall gauge ratio, being defined as the mid-sidewall gauge divided by the shoulder gauge; wherein:
the mid-sidewall gauge ratio is within the range of 1.1 to 1.4.

14. The pneumatic radial ply runflat tire of claim 13, wherein:
the mid-sidewall gauge ratio is approximately equal to 1.3.

15. A pneumatic radial ply runflat tire comprising: a tread cap, two inextensible annular beads, a radial ply structure with at least one ply, a gas-impervious inner liner, a belt structure located between the tread cap and the radial ply structure, two sidewalls, a pair of transition regions wherein the tread cap smoothly transitions into each sidewall, a pair of bead filler apexes, at least one pair of sidewall wedge inserts, and a pair of chafers that protect the underlying ply structure from abrasion against a wheel rim having a rim flange, the tire being characterized by:
tire wall gauges that constantly increase in thickness from the transition region to a bead/flange area where the chafer extends axially outward over the rim flange when the tire is mounted on the wheel rim.

16. The pneumatic radial ply runflat tire of claim 15, further characterized by:
a tire wall gauge being a shoulder gauge, measured in the middle of the transition regions;
a tire wall gauge being a bead/flange gauge, measured immediately radially outward of the portion of the chafer that contacts the wheel rim flange; and
a bead/flange gauge ratio, being defined as the bead/flange gauge divided by the shoulder gauge; wherein:
the bead/flange gauge ratio is within the range of 1.5 to 1.8.

17. The pneumatic radial ply runflat tire of claim 16, wherein:
the bead/flange gauge ratio is approximately equal to 1.7.

18. The pneumatic radial ply runflat tire of claim 16, further characterized by:
a tire wall gauge being a mid-sidewall gauge, measured at the middle of the section height of the sidewall; and
a mid-sidewall gauge ratio, being defined as the mid-sidewall gauge divided by the shoulder gauge; wherein:
the mid-sidewall gauge ratio is within the range of 1.1 to 1.4.

19. The pneumatic radial ply runflat tire of claim 18, wherein:
the mid-sidewall gauge ratio is approximately equal to 1.3.

20. The pneumatic radial ply runflat tire of claim 15, further characterized by:
a tire wall gauge being a shoulder gauge, measured in the middle of the transition regions;
a tire wall gauge being a mid-sidewall gauge, measured at the middle of the section height of the sidewall; and
a mid-sidewall gauge ratio, being defined as the mid-sidewall gauge divided by the shoulder gauge; wherein:
the mid-sidewall gauge ratio is within the range of 1.1 to 1.4, and is preferably approximately equal to 1.3.

\* \* \* \* \*